United States Patent
Ishii et al.

(10) Patent No.: US 6,714,584 B1
(45) Date of Patent: Mar. 30, 2004

(54) CDMA ADAPTIVE ANTENNA RECEIVING APPARATUS AND COMMUNICATION SYSTEM

(75) Inventors: Naoto Ishii, Tokyo (JP); Shousei Yoshida, Tokyo (JP); Akihisa Ushirokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/286,416

(22) Filed: Apr. 6, 1999

(30) Foreign Application Priority Data

Apr. 7, 1998 (JP) .......................... 10-094626

(51) Int. Cl.[7] .................. H04B 15/00; H04K 1/00; H04L 27/30
(52) U.S. Cl. .................. 375/148; 375/144; 375/347; 455/273
(58) Field of Search .................. 375/148, 144, 375/267, 347, 349; 455/137, 303, 272, 273; 342/383, 368, 378, 380

(56) References Cited

U.S. PATENT DOCUMENTS

| 4,736,460 A | * | 4/1988 | Rilling ........................ 455/283 |
| 5,218,359 A | * | 6/1993 | Minamisono ............... 342/383 |
| 6,061,553 A | * | 5/2000 | Matsuoka et al. .......... 455/273 |
| 6,069,912 A | * | 5/2000 | Sawahashi et al. ......... 375/142 |
| 6,205,166 B1 | * | 3/2001 | Maruta et al. .............. 375/130 |
| 6,320,899 B1 | * | 11/2001 | Chang et al. ............... 375/147 |

FOREIGN PATENT DOCUMENTS

| EP | 0 667 686 A2 | 8/1995 |
| EP | 0 899 894 A2 | 3/1999 |
| EP | 0 896 441 A2 | 10/1999 |
| JP | 57-20001 | 2/1982 |
| JP | 58-53203 | 3/1983 |
| JP | 25-72200 | 10/1996 |
| JP | 9-199925 | 7/1997 |
| JP | 9-307335 | 11/1997 |

* cited by examiner

*Primary Examiner*—Phoung Phu
(74) *Attorney, Agent, or Firm*—Sughrue Mion, PLLC

(57) ABSTRACT

A CDMA adaptive antenna receiving apparatus is provided with plural receivers of which each is for receiving one or more of desired signal components incoming at the same time. Each of the plural receivers includes plural adaptive receiving units for updating sequentially a directivity in accordance with one desired signal component. The plural adaptive receiving units which are included in the same receiver employ a symbol decision error of the same receiver in common. Each receiver further includes a means for detecting the incoming directions of the plural desired signal components and a means for controlling directivities of the plural adaptive receiving units in accordance with the incoming directions of the plural desired signal components and directivities of the plural adaptive receiving units.

22 Claims, 6 Drawing Sheets

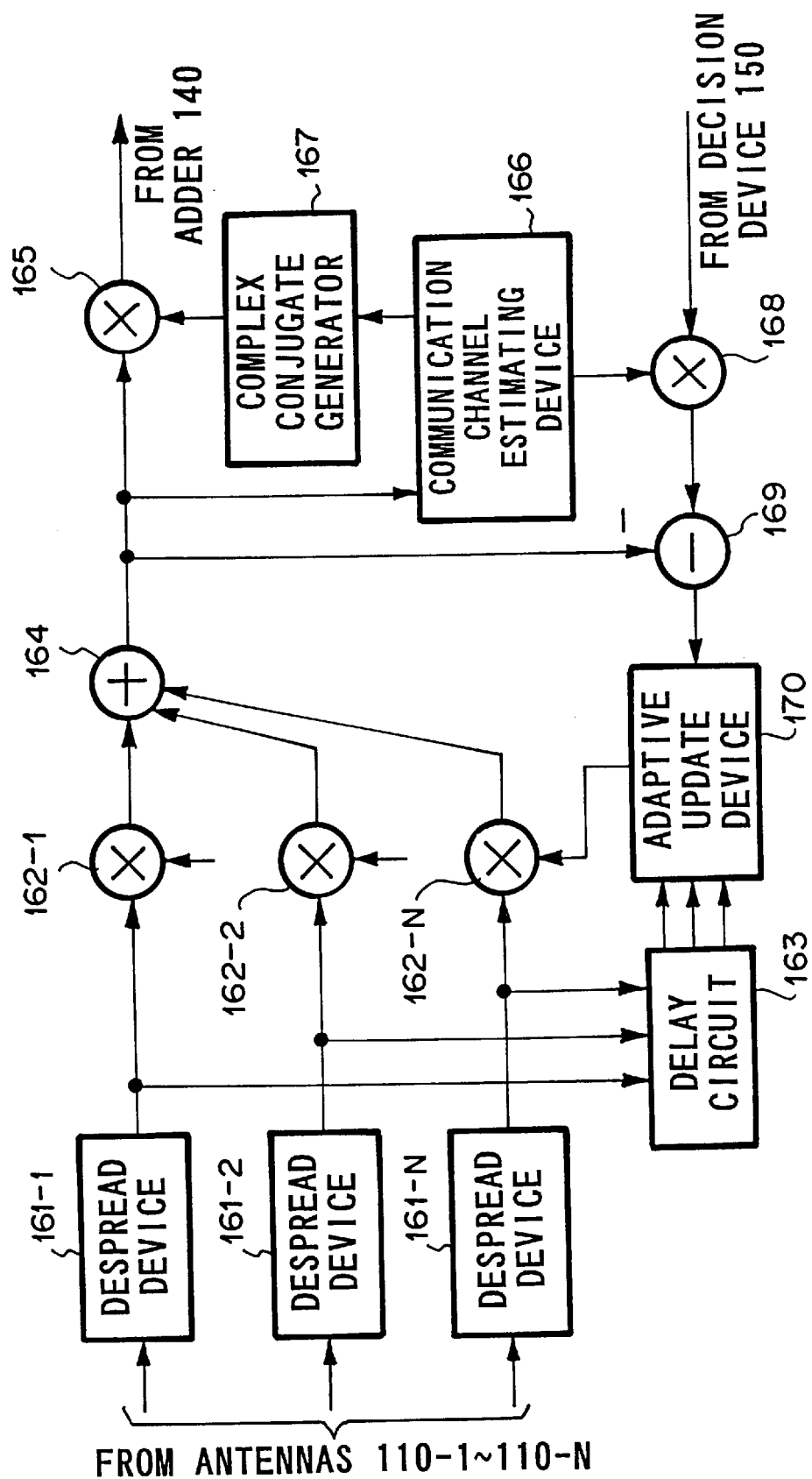

CDMA ADAPTIVE ANTENNA RECEIVING APPARATUS AND COMMUNICATION SYSTEM

BACKGROUND OF THE INVENTION

1. Field of the Invention

The present invention relates to a CDMA (Code Division Multiple Access) adaptive antenna receiving apparatus and more particularly, to a CDMA adaptive antenna receiving apparatus for separating and synthesizing a plural of desired signal components incoming at a plural of different timings and from a plural of different directions at each timing.

2. Description of the Related Art

The CDMA system capable of developing greatly a capacity for subscribers has been remarkable as a multiple access system for use in a mobile communication system including a base station and portable mobile stations.

The CDMA adaptive antenna receiving apparatus for use in a CDMA mobile communication system is subjected to eliminate the interference by means of the directivity of the antenna. This is explained in "TDL Adaptive Array Antenna Employing Spread Process Gain for Spectrum Spread Multi-dimensional Connection", Oho, Kohno and Imai, Electronics Information and Communication Society Journal, vol. J75-BII, No. 11, pp. 815–825, 1992. This is also explained in "Characteristic of Decision Feedback type Coherent Adaptive Diversity in DS-CDMA", Tanaka, Miki and Sawahashi, Electronics Information and Communication Society, Radio Communication System Study Group Technical Report, RCS96-102, November 1996.

FIG. 5 is a block diagram showing an example of the conventional CDMA adaptive antenna receiving apparatus, so-called RAKE receiver. Defining N (N is an integer of 2 or more) for the number of receiving antennas and M (M is an integer of 2 or more) for the number of multi-paths, a CDMA adaptive antenna receiving apparatus for No. k user (k is an integer of 1 or more) will be explained. Signals received at antennas 110-1 to 110-N are classified into a first through No. M paths in accordance with delay times thereof, and are introduced into delay circuits 120-2 to 120-M and adaptive receivers 130-1 to 130-M. Delay circuits 120-2 to 120-M may delay the input signals so as to synchronize with the first path. Delay circuit 120-1 having a time delay of 0 is omitted from the drawing. Outputs of the adaptive receivers are summed at adder 140 and the output therefrom is fed into decision device 150. The output signal from decision device 150 is not only output as a reception symbol of the No. k user but also sent to adaptive receivers 130-1 to 130-M.

Adaptive receivers 130-1 to 130-M have the same construction. FIG. 6 shows the adaptive receiver for No. m path ($1 \leq m \leq M$). Received signals are despread by despread devices 161-1 to 161-N, and are thereafter sent to multipliers 1621-1 to 162-N and delay circuit 163. The received signals are multiplied by reception weights at multipliers 161-1 to 161-N and then are summed for weight synthesizing at adder 164. The reception weights are components of a vector. Each component of the vector is employed at multipliers 161-1 to 161-N. The weight-synthesized signal is sent to multiplier 165, communication channel estimating device 166 and subtracter 169. Communication channel estimating device 166 may estimate a communication distortion based on the output from 164. Complex conjugate generator 167 generates a complex conjugate number of the communication distortion that is multiplied by the output of adder 164 at multiplier 165. The output from multiplier 165 is a demodulated signal to be sent to adder 140 shown in FIG. 5. The outputs from adaptive receivers 130-1 to 130-M are added with each other at adder 140 for performing the RAKE synthesis, and then a data symbol is decided at decision device 150.

In adaptive receiver 130-m ($1 \leq m \leq M$), the output from decision device 150 is multiplied by the communication channel distortion output from communication channel estimating device 166 to be input into subtracter 169. Subtracter 169 computes an error by subtracting the output of adder 164 from the output of multiplier 168. The error is fed to adaptive update device 170. Adaptive update device 170 updates the reception weight vector by using the error from subtracter 170 and the signals that are received at the antennas and delayed by a demodulation time at delay circuit 163. A known algorithm (for example, Least Mean Square Algorithm) may be available for the adaptive update algorithm.

The conventional technology has an disadvantage in which the plural desired signals incoming from different directions at the same time can not be separated and synthesized. This is because only one reception weight vector is provided per adaptive receiver.

Another disadvantage of the conventional technology is that the convergence speed of the reception weight vector is slow and the response is low. This is because the process for deciding the initial value of the reception weight vector is identical for any communication channel, and the previous reception weight vector before interruption is not employed at the beginning of next update operation.

SUMMARY OF THE INVENTION

An object of the present invention is to provide a CDMA adaptive antenna receiving apparatus capable of separating and synthesizing the plural desired signals incoming from different directions at the same time.

Another object of the present invention is to provide a CDMA adaptive antenna receiving apparatus having an advantageous convergence speed of a reception weight vector and response.

The CDMA adaptive antenna receiving apparatus according to the present invention comprises a plural of adaptive receiving units in each adaptive receiver. This constitution enables to provide a directivity for each of desired signals incoming at different timings and from different directions at the same time, and thus the first object may be achieved.

The present invention further comprises a means for controlling the reception weight vectors. This constitution enables to anticipate the incoming directions of the desired signals, and thus the second object may be achieved.

BRIEF DESCRIPTION OF THE DRAWINGS

The present invention will be more fully understood from the following detailed description taken in conjunction with the accompanying drawings in which:

FIG. 6 is a block diagram showing the constitution of the adaptive receiver in FIG. 5.

DETAILED DESCRIPTION OF THE PREFERRED EMBODIMENTS

[Embodiment 1]

Figure 1:
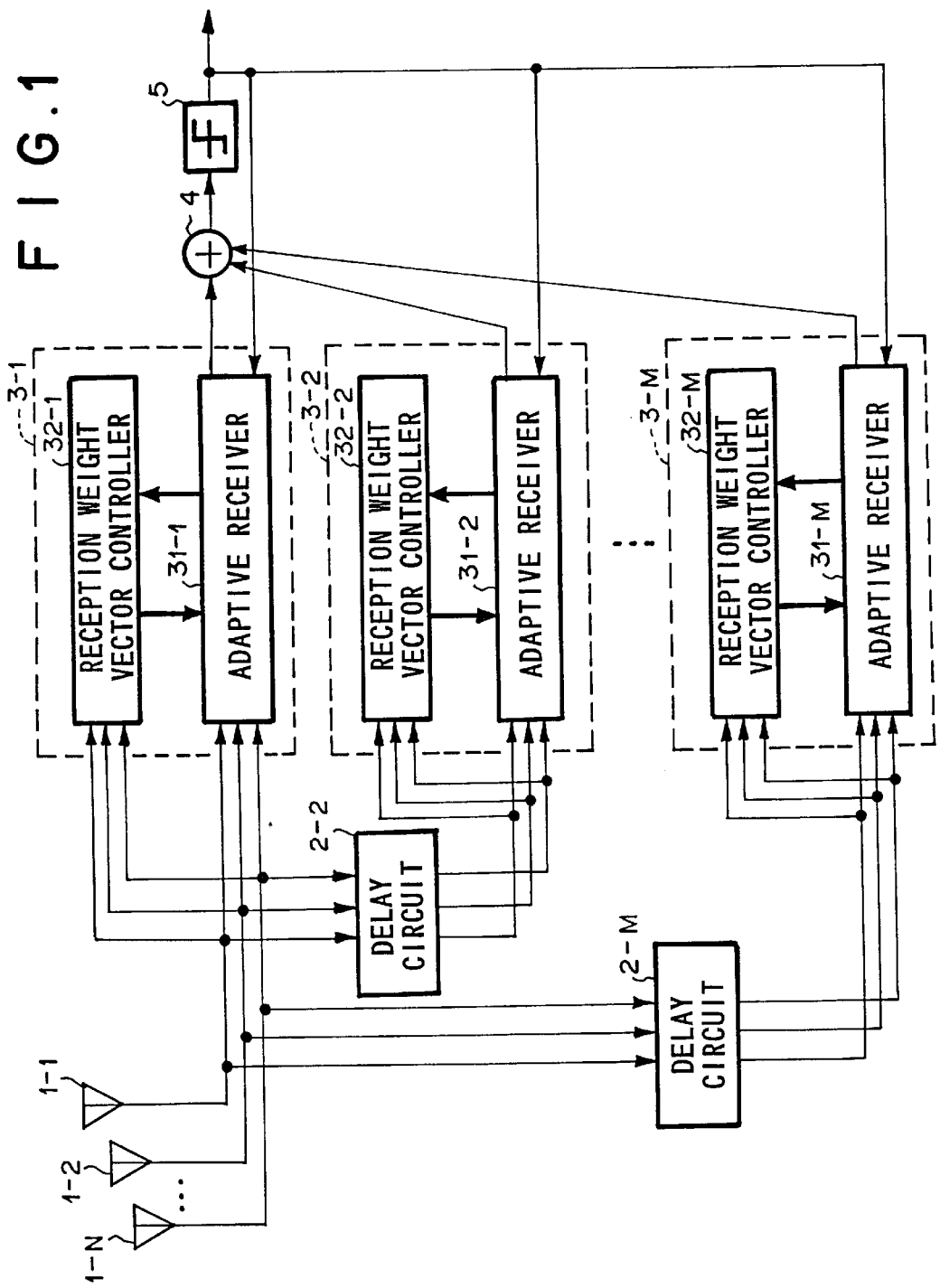
FIG. 1 is a block diagram showing a CDMA adaptive antenna receiving apparatus according to the present invention.

Defining N (N is an integer of 2 or more) for the number of receiving antennas, M (M is an integer of 2 or more) for the number of multi-paths, L (L is an integer of 1 or more) for the number of adaptive receiving unit, a CDMA adaptive antenna receiving apparatus for No. k user (k is an integer of 1 or more) will be explained with reference to FIGS. 1–4. Signals received at different directional antennas 1-1 to 1-N are introduced into delay circuits 2-2 to 2-M. A directivity in a direction, for example, at every equal angle (360/N degrees) is assigned to each of antennas 1-1 to 1-N, respectively. Delay circuit 2-1 has a time delay of 0 and thus is omitted in the drawings. Delay circuits 2-2 to 2-M adaptively delay the received signals so that receivers 3-1 to 3-M may receive simultaneously the desired signal components incoming at different timings. As the result, the signals incoming at different timings may be supplied to each of receivers 3-1 to 3-M. The outputs from receivers 31 to 3-M are synthesized at adder 4. Decision device 5 may decide a transmission symbol of No. k user based on the output of adder 4. The decided symbol is fed back to receivers 3-1 to 3-M for use in the adaptive update of the reception weight vectors.

Receivers 3-1 to 3-M will be explained in detail next. Receivers 3-1 to 3-M comprise adaptive receivers 31-1 to 31-M and reception weight vector controllers 31-1 to 32-M, respectively.

Figure 2:
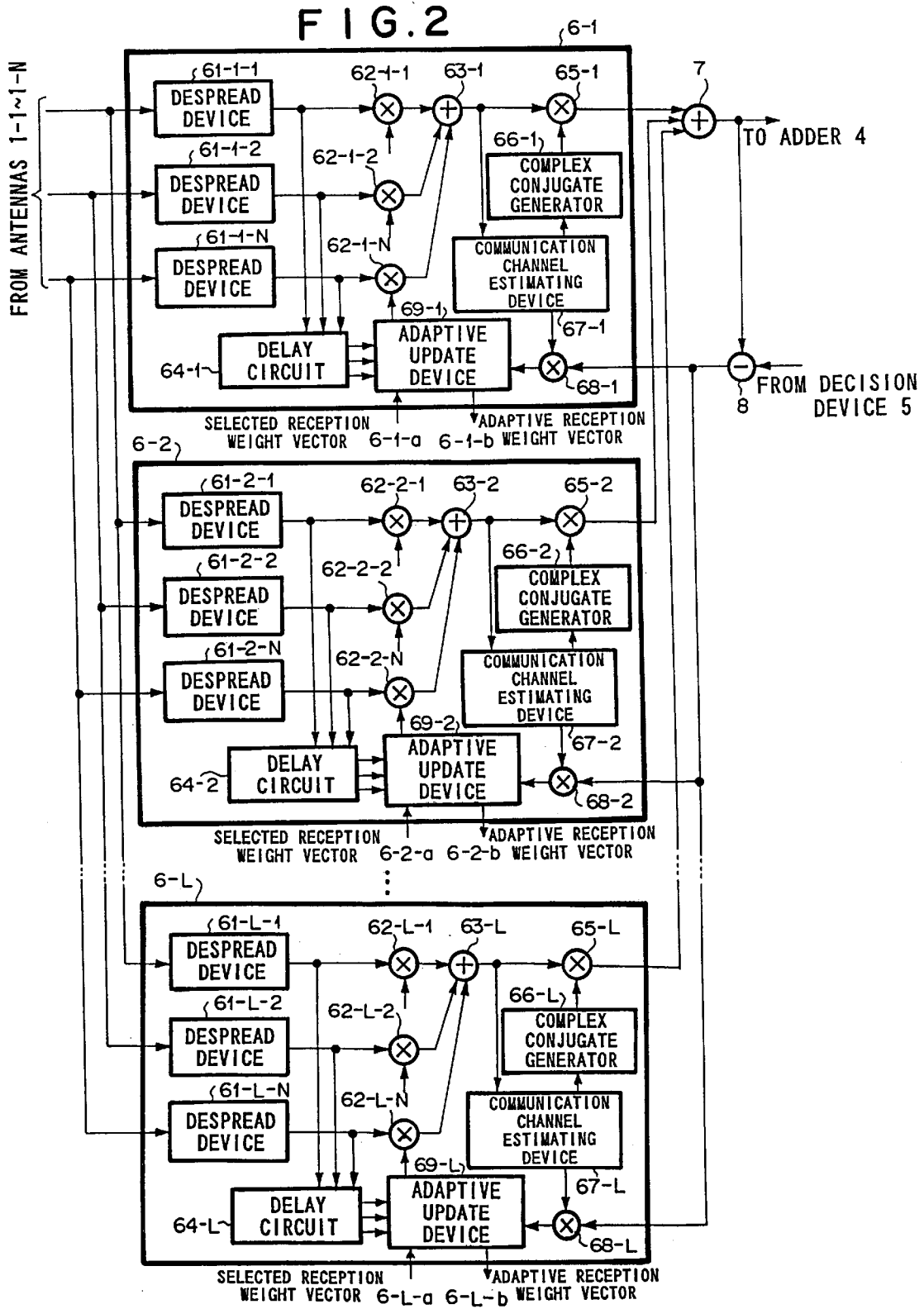
FIG. 2 is a block diagram showing a constitution of the adaptive receiver in FIG. 1.

Adaptive receivers 31-1 to 31-M have the same configuration, so adaptive receiver 31-1 will be explained first with reference to FIG. 2. Reception weight vector controller 32-1 may find desired signals incoming from L directions. Adaptive receiver 31-1 includes adaptive receiving units 6-1 to 6-L for the L directions as shown in FIG. 2. Other adaptive receivers 32-2 to 32-M may also find the number of desired signals by means of reception weight vector controllers 32-2 to 32-M, respectively, and thus may include the same number of adaptive units as well.

As adaptive receiving units 6-1 to 6-L have the same configuration, adaptive receiving unit 6-1 is explained. The signal input to adaptive receiving unit 6-1 is despread by despread devices 61-1-1 to 61-1-N. Adaptive receiving unit 6-1 accepts at adaptive update device 69-1 thereof a selected reception weight vector 6-1-*a* from reception weight vector controller 32-1. Despread signals are multiplied by components of adaptive reception weight vector at multipliers 62-1-1 to 62-1-N, respectively, and then summed each other at adder 63-1. Each component of the adaptive reception weight vector is supplied to one of multipliers 62-1-1 to 62-1-N. The summed signal consists of signals which are received at antennas 1-1 to 1-N and weighted, and thus has a specific directivity. Therefore, an antenna beam may be formed at the output of adder 63-1. The despread signals are also fed to delay circuit 64-1. Communication channel estimating device 67-1 accepts the weight-summed signal and estimates a communication channel distortion that is represented by a complex number. Complex conjugate generator 66-1 generates a complex conjugate number of the communication channel distortion. The weight-summed signal is multiplied by the complex conjugate number to be detected. Communication channel estimating device 67-1 may employ such an estimating process in which a transmission path characteristic (fading characteristic) is measured on a known symbol that is inserted periodically, and another transmission path characteristic of a signal symbol part other than the measured part is interporated. This process is described in "Fading Distortion Compensating Process for Ground Mobile Communication 16QAM", Sanpei, Electronics Information and Communication Society Journal, vol. J75-BII, No. 1, pp. 7–15, 1989.

An adder 7 sums the demodulation results obtained at adaptive receiving units 6-1 to 6-N. The summed signal is a synthesis of the demodulation results of the desired signals incoming from different directions simultaneously. Subtracter 8 obtains an error that is a difference between the decided result obtained at decision device 5 and the output from adder 7. The error is employed as a symbol decision error of adaptive receiver 31-1 for adaptive receiving units 6-1 to 6-L in adaptive receiver 31-1 in common.

A further explanation will be made with respect mainly to adaptive receiving unit 6-1. The common symbol decision error is multiplied by the output of communication channel estimating device 67-1 and then fed to adaptive update device 69-1. Adaptive update device 69-1 updates the selected reception weight vector obtained from reception weight vector controller 32-1 and sends the adaptive-updated adaptive reception weight vector to multipliers 62-1-1 to 62-1-N and reception weight vector controller 32-1. The despread signals from despread devices 61-1-1 to 61-1-N are delayed by a time period required to compute an error to be output from a multiplier 68-1, and then fed to adaptive update device 69-1. Adaptive update device 69-1 updates the reception weight vector by using these two signals; the error out of multiplier 68-1 and the despread signals output from delay circuit 64-1. The least mean square error control may be employed as the adaptive update algorithm. Reception weight vectors are updated independently to each other in adaptive receiving units 6-2 to 6-L as well by using the common symbol decision error output from subtracter 8.

Figure 3:
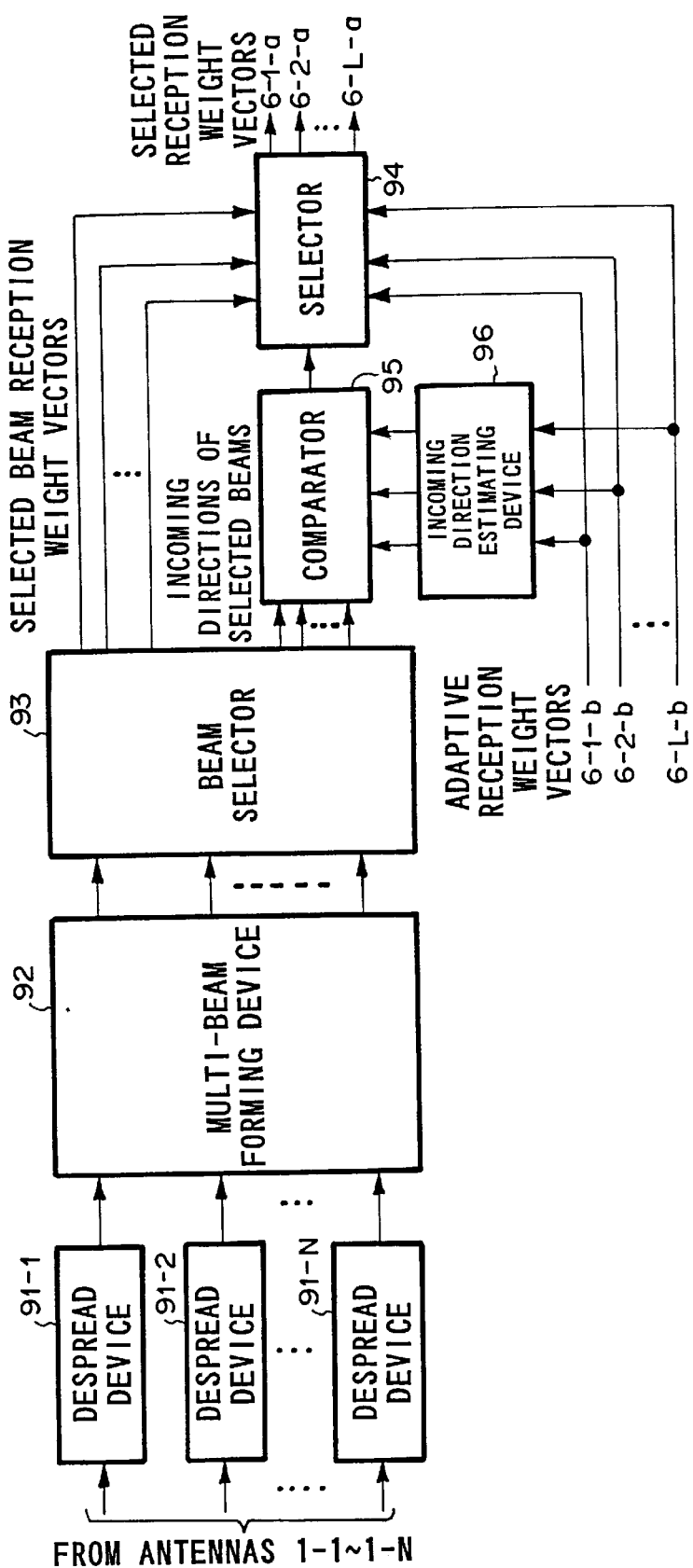
FIG. 3 is a block diagram showing a constitution of the reception weight vector controller in FIG. 1.

Reception weight vector controllers 32-1 to 32-M have the same configuration, so reception weight vector controller 32-1 will be explained next with reference to FIG. 3.

The signals received at antennas 1-1 to 1-N and fed to reception weight vector controller 32-1 are despread individually at despread devices 91-1 to 91-N, respectively. The despread signals are introduced into a multi-beam forming device 92. Multi-beam forming device 92 previously has a plural set of reception weight vectors for forming directional beams in different directions, and provides a plural of output beams and incoming directions corresponding thereto to beam selector 93. Directions of beams in multi-beam forming device 92 may be arranged equidistantly so that an output from any direction can be obtained. Beam selector 93 compares the incoming desired signal levels with each other and selects one or more (and L or less) outputs having relatively higher levels. The number of the reception weight vectors in multi-beam forming device 92 is generally prepared to be larger than that of outputs with relatively higher levels to be selected. Beam selector 93 feeds reception weight vectors for forming each of selected beams to a selector 94 and beam incoming directions thereof to comparator 95. Selector 94 accepts the selected beam reception weight vector from beam selector 93 and adaptive reception weight vectors 6-1-*b* to 6-L-*b* that are computed at adaptive update devices 69-1 to 69-L of adaptive receiving units 6-1 to 6-L, respectively, in adaptive receiver 31-1.

Incoming direction estimating device 96 accepts adaptive reception weight vectors 6-1-*b* to 6-L-*b* from adaptive update devices 69-1 to 69-L of adaptive receiving units 6-1 to 6-L, respectively, in adaptive receiver 31-1 and estimates incoming directions thereof. Incoming direction estimating device 96 will be explained in detail with reference to FIG. 4.

Incoming direction generator 96-1 generates incoming directions. Reception weight vector generator 96-2 converts the incoming directions into reception weight vector. A correlation computer 96-3 computes a correlation between the reception weight vector obtained from reception weight generator 96-2 and one of adaptive reception weight vectors **6-1-*b* to 6-L-*b*. A maximum value detector 96-4 obtains a maximum correlation value based on the result of the correlation computing with respect to a plural of incoming directions. Incoming direction output device 96-5 selects an incoming direction corresponding to the maximum correlation value among the incoming directions that are fed from incoming direction generating device 96-1, and feeds it to comparator 95**.

Figure 4:
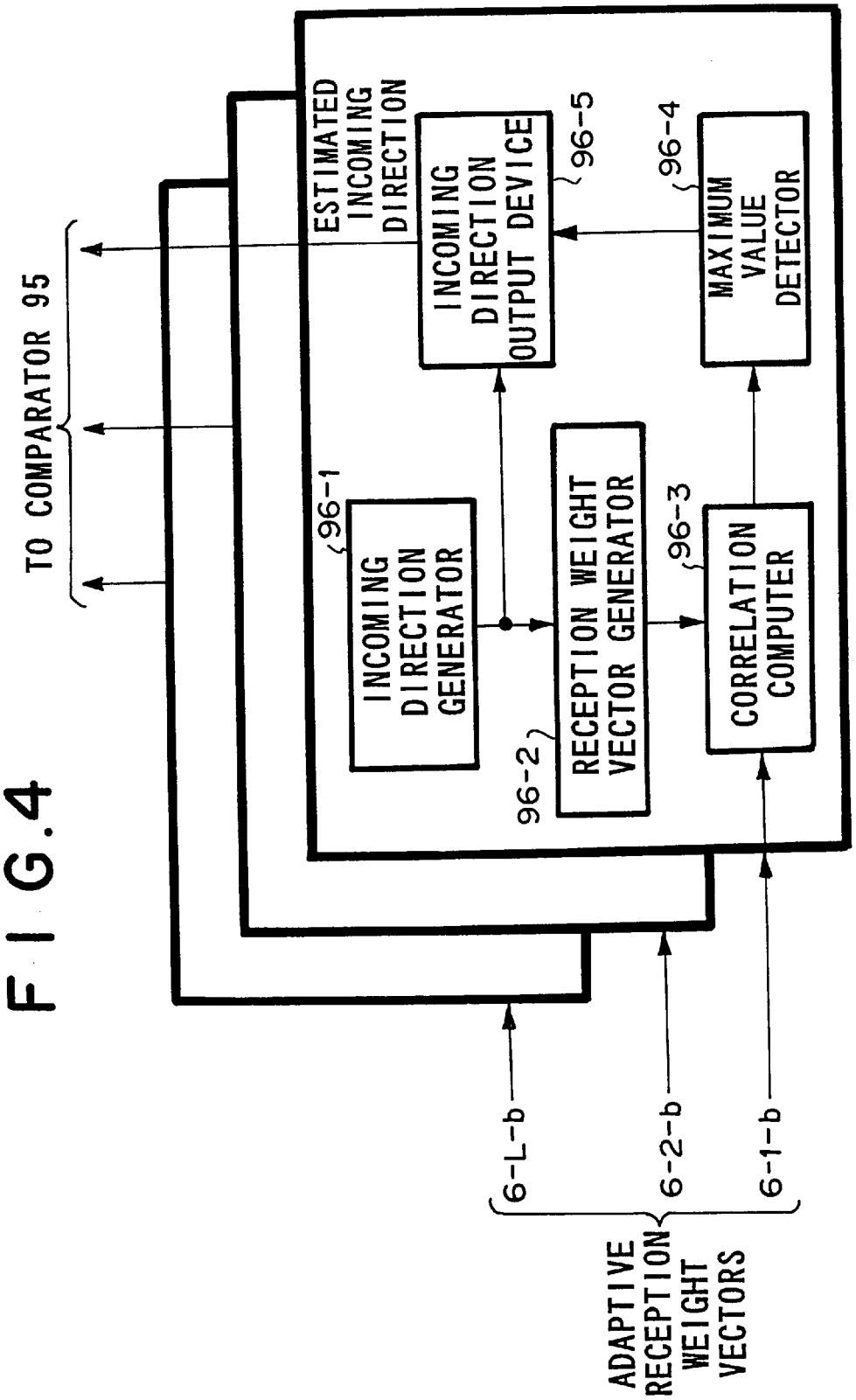
FIG. 4 is a block diagram showing a constitution of the incoming direction estimating means in FIG. 1.
Figure 5:
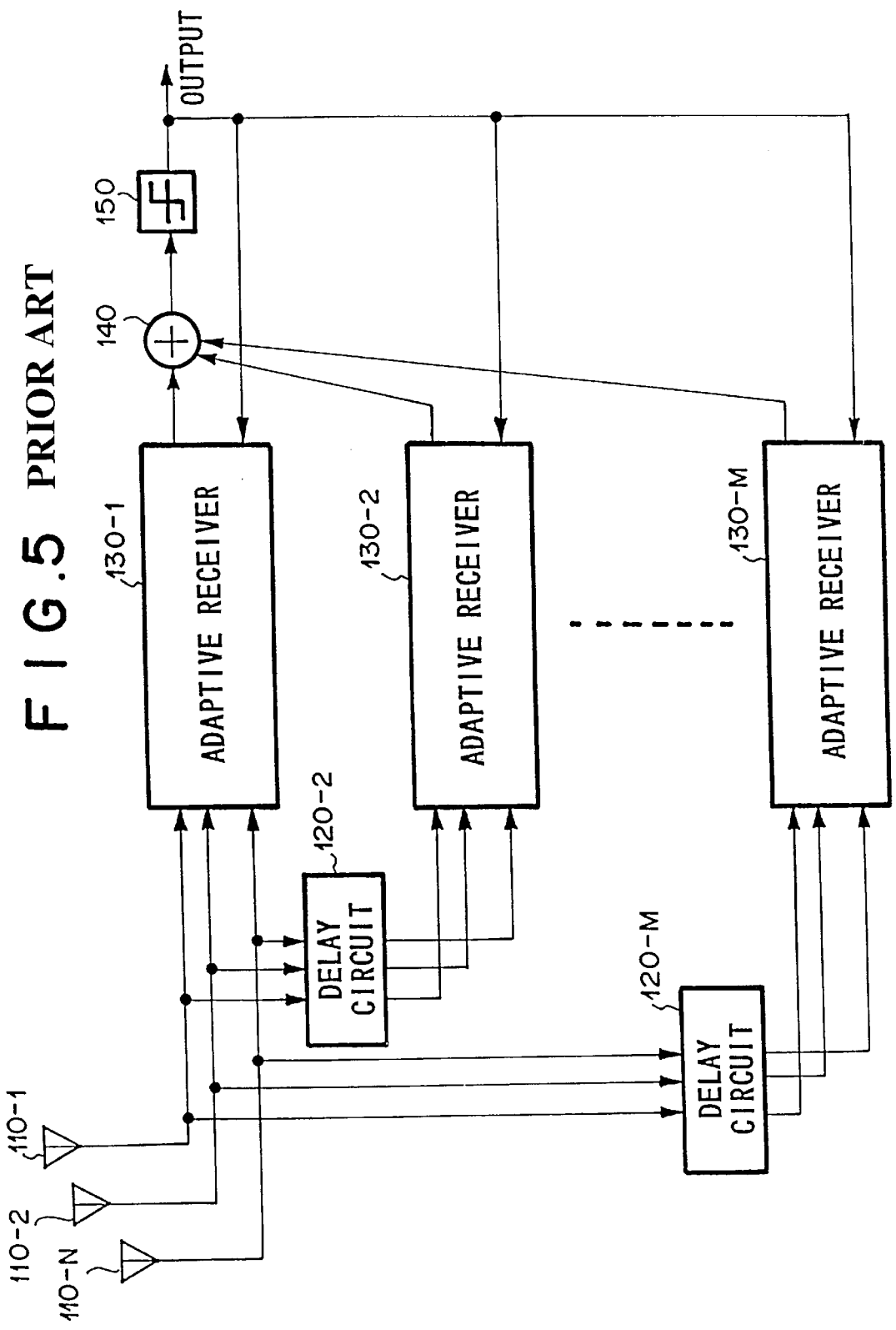
FIG. 5 shows the conventional CDMA adaptive antenna receiving apparatus.

Incoming direction estimating device 96 consists of L groups of circuits in FIG. 4 but may also be realized with only one group of circuits capable of operating in a time-divisional processing.

Comparator 95 compares the selected beam incoming directions supplied from beam selector 93 with the incoming directions corresponding to the adaptive reception weight vectors supplied from incoming direction estimating device 96, and sends information for selecting any one of the two kinds of incoming directions to selector 94. Selector 94 selects the selected beam weight vector or the adaptive reception weight vector, and sends the selected one to each of adaptive update devices 69-1 to 69-L of adaptive receiving units 6-1 to 6-L in adaptive receiver 31-1 as each of selected reception weight vectors **6-1-*a* to 6-L-*a*. Selector 94 may also output specific values sustained therein, as described later, as selected reception weight vectors 6-1-*a* to 6-L-*a***.

The operations of selector 94 and comparator 95 will be herein explained in detail. Comparator 95 operates to repeat a cycle consisting of L times of identical processes corresponding to L incoming directions, and serves to provide an initial value of the reception weight vector.

Selector 94 initializes selected reception weight vectors **6-1-*a* to 6-L-*a* successively within one cycle. Selector 94 selects one, that is indicated by comparator 95 as selected reception weight vector 6-i-*a* (i=1 to L), from adaptive reception weight vector 6-i-*b* (i=1 to L) and selected beam reception weight vector in case of initialization. It also selects adaptive reception weight vector 6-i-*b* (i=1 to L) as selected reception weight vector 6-i-*a*** (i=1 to L) in cases other than initialization.

Comparator 95 provides selector 94 with information for indicating which one of selected beam reception weight vector and adaptive reception weight vector should be selected at the time of initialization. The information may be determined as follows:

At first, the incoming direction of the selected beam and the incoming direction corresponding to the adaptive reception weight vector are compared. Then, in the case where an adaptive reception weight vector corresponding to the incoming direction of the selected beam is not present, an adaptive receiving unit having the reception weight vector corresponding to the beam newly selected for the selected direction as an initial value is added.

To the contrary, in the case where no selected beam is present in the incoming direction corresponding to adaptive reception weight vector output from a certain adaptive receiving unit, an operation of the concerned adaptive receiving unit is halted. The addition of the adaptive receiving unit is realized by re-starting the operation of a halted adaptive receiving unit while providing the reception weight vector corresponding to the newly selected beam to the unit as an initial value of the selected reception weight vector. The addition and halt may be performed by providing a specific selected reception weight vector contained in selector 94 to the unit, or by varying the signal value on the control line not shown in the figures, for example.

If a plural of adaptive reception weight vectors are present, which corresponds to a certain direction among the incoming directions of the selected beams, then an operation of an adaptive receiving unit which has the adaptive reception weight vector for generating the most accurate output is to be continued, while operations of other adaptive receiving units having other adaptive reception weight vectors are to be halted. The signal levels output from adders 63-1 to 63-L within adaptive receiving units 6-1 to 6-L may be referred to so as to detect the adaptive receiving unit having the adaptive reception weight vector for generating the most accurate output.

In the case where an initial communication starts, adaptive reception weight vectors are not determined. In addition, incoming directions may not be estimated because no adaptive reception weight vector is fed into incoming direction estimating device 96. Further, no adaptive reception weight vector is fed into selector 94. Therefore, the selected beam weight vectors corresponding to incoming directions obtained by beam selector 93 are selected at selector 94 and sent to adaptive update devices 69-1 to 69-L of adaptive receiving units 6-1 to 6-L, respectively, in adaptive receiver 31-1.

Reception weight vector controller 31-1 provides adaptive update devices 69-1 to 69-L with selected beam reception weight vectors that are reception weight vectors close to the optimum values as initial values for improving the convergence of the adaptive update of reception weight vectors to optimum values.

There is a case where a communication re-starts after a certain short time period from the termination of the previous communication for a CDMA packet communication. The time period is so short that a location of a base station does not go out of a reception range of each antenna beam, for example, in case of an instantaneous disconnection. In such the case, incoming direction estimating device 96 estimates incoming directions by using the adaptive reception weight vectors of at the time of the termination of the previous communication as the inputs thereof, and feeds the incoming directions to comparator 95. Selector 94 selects either the selected beam weight vector or the adaptive reception weight vector based on the output of comparator 95. Selector 94 further sends it to adaptive update devices 69-1 to 69-L of adaptive receiving units 6-1 to 6-L, respectively, in adaptive receiver 31-1. This operation may allow the reception weight vectors to respond to the communication channel variation with ease.

[Embodiment 2]

The second embodiment employs only one adaptive receiving unit while the first embodiment uses one or a plural of adaptive receiving units 6-1 to 6-L. Therefore, L=1 in the second embodiment.

In the second embodiment, multi-beam forming device 92 serves as the same as that in the first embodiment, and beam selecting device 93 selects one beam having a relatively higher reception level. Comparator 95 compares the selected beam incoming direction with the incoming direction estimated on the basis of adaptive reception weight 6-1-b. comparator 95 instructs selector 94 to select adaptive reception weight 6-1-b in case of both directions being substantially coincident but to select the beam reception weight in the other cases.

The operations in the case of the initial communication starting and of the instantaneous disconnection occurring are performed similarly as are in the first embodiment.

The present invention has no limitation regarding the arranging interval of the receiving antennas, though the directivities of the receiving antennas are exemplified as being equidistant in the above-described embodiments. For example, an arranging interval equal to a half wave-length of the carrier may also be employed. The present invention has no limitation regarding the number of receiving antennas. The present invention has also no limitation regarding the arrangement of the receiving antennas. For example, a circular arrangement and a linear arrangement may also be employed. Further, the present invention has no limitation regarding the directivity of each receiving antenna. For example, an omni-antenna and a sector-antenna may also be used as each receiving antenna.

As explained above, the present invention may achieve the separating and synthesizing the plural desired signals incoming from different directions at the same time. This is because that the plural antenna beams can be prepared simultaneously.

In addition, according to the present invention, the adaptive reception weight vectors may converge on the optimum value rapidly. This is performed by the reception weight vector controller for obtaining the initial values close to the optimum values of the selected reception weight vectors and the adaptive receivers for updating the reception weight vectors to the optimum values based on the initial values.

Further, according to the present invention, updating the reception weight vectors adaptively in a good response to the communication channel variation may be achieved. This is performed by initializing the operation of the selective receivers in accordance with the new incoming direction of the desired signal component on basis of the incoming direction estimated from the selected beam incoming direction and the adaptive reception weight vectors.

According to the present invention, updating the reception weight vectors adaptively in a good response to the communication channel variation may be achieved even in the case of a temporary disconnection of communication. This is because the adaptive reception weight vectors at the time before the disconnection may be employed after the disconnection.

Further, according to the present invention, the power consumption may be lowered because the adaptive receiving units having the same reception weight vector do not operate. And because the operations of the adaptive receiving units for forming the directivities for the directions which have no selected beam incoming direction may be halted.

Having described preferred embodiments of the invention, it will now become apparent to those of ordinary skill in the art that other embodiments incorporated these concepts may be used. Accordingly, it is submitted that the invention should not be limited to the described embodiments but rather should be limited only by the spirit and scope of the appended claims.

What is claimed is:

1. A receiving apparatus for receiving a desired signal by synthesizing a plurality of desired signal components incoming at a plurality of different timings and from a plurality of different directions at each timing while eliminating interference signals, which comprises:

a plurality of receivers of which each receives one or more of said desired signal components incoming from different directions at the same time, wherein each of said plurality of receivers comprises a plurality of adaptive receiving units of which each updates a directivity thereof so as to match with an incoming direction of one of said desired signal components incoming from different directions at the same time, wherein said plurality of adaptive receiving units included in the same receiver employ a symbol decision error of said same receiver in common.

2. A receiving apparatus for receiving a desired signal by synthesizing a plurality of desired signal components incoming at a plurality of different timings and from a plurality of different directions at each timing while eliminating interference signals, which comprises:

a plurality of receivers of which each receives one or more of said desired signal components incoming from different directions at the same time, wherein each of said plurality of receivers comprises a plurality of adaptive receiving units of which each updates a directivity thereof so as to match with an incoming direction of one of said desired signal components incoming from different directions at the same time, wherein each said receiver further comprises:

a means for detecting a plurality of sections containing said incoming directions of said plurality of desired signal components; and a control means for controlling directivities of said plurality of adaptive receiving units in accordance with said detected sections containing said incoming directions of said plurality of desired signal components and said directivities of said plurality of adaptive receiving units, wherein in case of directivities of all the working adaptive receiving units being not contained within one of said plurality of sections containing said incoming directions, said control means adds another adaptive receiving unit having a directivity to be included within the section concerned.

3. A receiving apparatus for receiving a desired signal by synthesizing a plurality of desired signal components incoming at a plurality of different timings and from a plurality of different directions at each timing while eliminating interference signals, which comprises:

a plurality of receivers of which each receives one or more of said desired signal components incoming from different directions at the same time, wherein each of said plurality of receivers comprises a plurality of adaptive receiving units of which each updates a directivity thereof so as to match with an incoming direction of one of said desired signal components incoming from different directions at the same time, wherein each said receiver further comprises:

a means for detecting a plurality of sections containing said incoming directions of said plurality of desired signal components; and a control means for controlling directivities of said plurality of adaptive receiving units in accordance with said detected sections containing said incoming directions of said plurality of desired signal components and said directivities of said plurality of adaptive receiving units, wherein in case of directivities of a plurality of working adaptive receiving units being contained within one of said plurality of said sections including said incoming directions, said control means halts operations of adaptive receiving units other than that having relatively higher reception accuracy among said plurality of said working adaptive receiving units.

4. A receiving apparatus for receiving a desired signal by synthesizing a plurality of desired signal components incoming at a plurality of different timings and from a plurality of different directions at each timing while eliminating interference signals, which comprises:

a plurality of receivers of which each receives one or more of said desired signal components incoming from different directions at the same time, wherein each of said plurality of receivers comprises a plurality of adaptive receiving units of which each updates a directivity thereof so as to match with an incoming direction of one of said desired signal components incoming from different directions at the same time, wherein each said receiver further comprises:

a means for detecting a plurality of sections containing said incoming directions of said plurality of desired signal components; and a control means for controlling directivities of said plurality of adaptive receiving units in accordance with said detected sections containing said incoming directions of said plurality of desired signal components and said directivities of said plurality of adaptive receiving units, wherein said control means halts operations of adaptive receiving units having directivities not contained within any of said plurality of said sections containing said incoming directions.

5. A receiving apparatus for receiving a desired signal by synthesizing a plurality of desired signal components incoming at a plurality of different timings and from a plurality of different directions at each timing while eliminating interference signals, which comprises:

a plurality of receivers of which each receives one or more of said desired signal components incoming from different directions at the same time, wherein each of said plurality of receivers comprises a plurality of adaptive receiving units of which each updates a directivity thereof so as to match with an incoming direction of one of said desired signal components incoming from different directions at the same time, wherein each said receiver further comprises:

a means for detecting a plurality of sections containing said incoming directions of said plurality of desired signal components; and a control means for controlling directivities of said plurality of adaptive receiving units in accordance with said detected sections containing said incoming directions of said plurality of desired signal components and said directivities of said plurality of adaptive receiving units, wherein in case of an instantaneous disconnection occurred, said control means sets directivities of said plurality of adaptive receiving units at the time before said instantaneous disconnection as directivities for said plurality of adaptive receiving units at the time after said instantaneous disconnection.

6. A receiving apparatus for receiving a desired signal by synthesizing a plurality of desired signal components incoming at a plurality of different timings and from a plurality of different directions at each timing while eliminating interference signals, which comprises:

a plurality of receivers of which each receives one of said desired signal components incoming from different directions at the same time, wherein each of said plurality of receivers comprises:

an adaptive receiving unit which updates a directivity thereof so as to match with any one of incoming directions of said plurality of desired signal components;

a means for detecting a plurality of sections containing said incoming directions of said plurality of desired signal components; and a control means for controlling the directivity of said adaptive receiving unit in accordance with said detected sections containing said incoming directions of said plurality of desired signal components and the directivity of said adaptive receiving unit, wherein in case of said directivity of said adaptive receiving unit being not contained within a section capable of obtaining desired signal components with relatively higher levels among said plurality of sections including said incoming directions, said control means sets a directivity representing the section concerned as the directivity of said adaptive receiving unit.

7. A receiving apparatus for receiving a desired signal by synthesizing a plurality of desired signal components incoming at a plurality of different timings and from a plurality of different directions at each timing while eliminating interference signals, which comprises:

a plurality of receivers of which each receives one of said desired signal components incoming from different directions at the same time, wherein each of said plurality of receivers comprises:

an adaptive receiving unit which updates a directivity thereof so as to match with any one of incoming directions of said plurality of desired signal components;

a means for detecting a plurality of sections containing said incoming directions of said plurality of desired signal components; and a control means for controlling the directivity of said adaptive receiving unit in accordance with said detected sections containing said incoming directions of said plurality of desired signal components and the directivity of said adaptive receiving unit, wherein said control means sets a directivity representing a section capable of obtaining desired signal components with relatively higher levels among said plurality of sections containing said incoming directions as the directivity for said adaptive receiving unit at the beginning of operation of said apparatus.

8. A receiving apparatus for receiving a desired signal by synthesizing a plurality of desired signal components incoming at a plurality of different timings and from a plurality of different directions at each timing while eliminating interference signals, which comprises:

a plurality of receivers of which each receives one of said desired signal components incoming from different directions at the same time, wherein each of said plurality of receivers comprises:

an adaptive receiving unit which updates a directivity thereof so as to match with any one of incoming directions of said plurality of desired signal components;

a means for detecting a plurality of sections containing said incoming directions of said plurality of desired signal components; and a control means for controlling the directivity of said adaptive receiving unit in accordance with said detected sections containing said incoming directions of said plurality of desired signal components and the directivity of said adaptive receiving unit, wherein in case of an instantaneous disconnection occurred, said control means sets a directivity of said adaptive receiving unit at the time before said instantaneous disconnection as a directivity for said adaptive receiving unit at the time after said instantaneous disconnection.

9. A CDMA adaptive antenna receiving apparatus which comprises:

a plurality of antennas;

a plurality of delay circuits of which each delays a plurality of signals received at said plurality of antennas by a certain time period in accordance with a time delay of a desired signal;

a plurality of adaptive receiving means of which each receives an output of said delay circuit with antenna beams, each said antenna beam being adaptive to an output of said delay circuit and independent from the other antenna beams;

a plurality of reception weight control means of which each controls reception weight vectors of each of said adaptive receiving means so that each of said adaptive receiving means receives desired signal components incoming from different directions at the same time by means of the antenna beams formed with the reception weight vectors;

a first adder for synthesizing outputs from said plurality of adaptive receiving means; and a decision device for performing symbol decision for an output of said first adder, said decision device feeding a decided symbol therefrom to said plurality of adaptive receiving means.

10. The CDMA adaptive antenna receiving apparatus, according to claim 9, wherein said adaptive receiving means comprises:

a plurality of adaptive receiving units each comprising the antenna beam;

a second adder for summing outputs of said plural of adaptive receiving units; and a subtracter for subtracting an output of said second adder from said decided symbol, said subtracter feeding a difference therefrom to said plurality of adaptive receiving means, wherein the antenna beam in each of adaptive receiving units receives each of desired signal components coming from different directions at the same time.

11. The CDMA adaptive antenna receiving apparatus according to claim 10, wherein each said plurality of adaptive receiving means comprises:

a plurality of despread means corresponding to a plurality of signals received at antennas;

a plurality of first multipliers for weighting outputs of said despread means by the reception weight vector;

a third adder for synthesizing outputs of said plurality of first multipliers;

a detector for demodulating an output of said third adder;

a second multiplier for multiplying an output of said subtracter by a communication channel distortion output from said detector; and an adaptive update means for computing the reception weight vector adaptively based on an output of said second multiplier and signals output from a plurality of said despread means and delayed, wherein the reception weight vector of said adaptive receiving unit is controlled independently from the reception weight vectors of the other adaptive receiving units.

12. The CDMA adaptive antenna receiving apparatus according to claim 11, wherein said adaptive update means controls said reception weight vector by means of a least mean square error control using a common symbol decision error output from said subtracter.

13. The CDMA adaptive antenna receiving apparatus according to claim 11, wherein said detector comprises:

a communication channel estimating means for estimating said communication channel distortion based on the output of said third adder;

a complex conjugate generating means for generating a complex conjugate number of said communication channel distortion; and a third multiplier for multiplying the output of said third adder by the complex conjugate number.

14. The CDMA adaptive antenna receiving apparatus according to claim 10, wherein said reception weight control means comprises:

a plurality of despread means corresponding to a plurality of signals received at antennas;

a multi-beam forming means for performing a plurality of weight synthesis different from one another for outputs of said plurality of said despread means so as to form a multi-beam for a plurality of different incoming directions, said multi-beam forming means generating signals received by each beam of said multi-beam;

a beam selecting means for selecting one or more beams having desired signals of higher levels among outputs of said multi-beam forming means, said beam selecting means generating the reception weight vectors and incoming directions corresponding to said selected beams;

an incoming direction estimating means for estimating incoming directions of desired signal components by using adaptive reception weight vectors computed at said adaptive receiving means;

a comparing means for comparing said estimated incoming directions of said desired signal components with said incoming directions of said selected beams; and a selecting means for selecting said reception weight vectors of said selected beams or said adaptive reception weight vectors based on outputs of said comparing means, said selecting means feeding outputs therefrom as selected reception weight vectors to said adaptive receiving means.

15. The CDMA adaptive antenna receiving apparatus according to claim 14, wherein said comparing means compares said incoming directions of said selected beams with said estimated incoming directions of said desired signal components in a certain cycle, wherein in case of said estimated incoming direction of said desired signal component corresponding to said incoming direction of said selected beam being not present, said selecting means provides said reception weight vector of said selected beam as an initial value of a reception weight vector for said adaptive receiving unit to be newly added, whereby a new adaptive receiving operation is started for said incoming direction of said selected beam.

16. The CDMA adaptive antenna receiving apparatus according to claim 14, wherein said comparing means compares said incoming directions of said selected beams with said estimated incoming directions of said desired signal components in a certain cycle, wherein in case of two or more of said estimated incoming directions of said desired signal components corresponding to a certain one of said incoming directions of said selected beams being present, said selecting means provides one adaptive reception weight vector controlled in the highest accuracy among said two or more of adaptive reception weight vectors as an selected weight vector for one adaptive receiving unit to be operated continuously, whereby an operation of said one of said adaptive receiving units for said certain one incoming direction of said selected beam is continued, and operations of the others of said adaptive receiving units for said certain one incoming direction of said selected are halted.

17. The CDMA adaptive antenna receiving apparatus according to claim 14, wherein said comparing means compares said incoming directions of said selected beams with said estimated incoming directions of said desired signal components in a certain cycle, wherein in case of said incoming direction of said selected beam corresponding to said estimated incoming direction of said desired signal component for one adaptive receiving unit being not present, said selecting means halts feeding a selected reception weight vector to said adaptive receiving unit, whereby operation of said adaptive receiving unit for said estimated incoming direction is halted.

18. The CDMA adaptive antenna receiving apparatus according to claim 14, wherein in case of, before an initial communication, said estimated incoming directions of said desired signal components being not in said comparing means, and the inputs of said adaptive reception weight vectors being not present in said selecting means, said selecting means selects and sends all said reception weight vectors of said selected beams to said adaptive receiving units as initial values of selected reception weight vectors, whereby new adaptive receiving operations for all said directions of said selected beams are performed.

19. The CDMA adaptive antenna receiving apparatus according to claim 14, wherein in case of re-starting a communication after a certain short time period from the termination of the previous communication, said comparing means employs said estimated directions of said desired signal components of at the time of said termination of said previous communication as inputs thereof, and said selecting means employs said adaptive reception weight vectors of at the time of said termination of said previous communication as inputs thereof.

20. A communication system including a base station and mobile stations, wherein said receiving apparatus according to any one of claims 1, 2–4 and 5 is used as said base station or said mobile stations.

21. A communication system including a base station and mobile stations, wherein said receiving apparatus according to any one of claims 6–8 is used as said base station or mobile stations.

22. A communication system including a base station and mobile stations, wherein said CDMA adaptive antenna receiving apparatus according to any one of claims 9–19 is used as said base station or said mobile stations.

* * * * *